United States Patent [19]

Macor

[11] Patent Number: 5,677,949
[45] Date of Patent: Oct. 14, 1997

[54] TELEPHONE WITH MINIMAL SWITCHES FOR DIALING

[75] Inventor: James Joseph Macor, Jackson, N.J.

[73] Assignee: Lucent Technologies Inc., Murray Hill, N.J.

[21] Appl. No.: 362,054

[22] Filed: Dec. 22, 1994

[51] Int. Cl.$^6$ .............................. H04M 1/02; H04M 1/56
[52] U.S. Cl. .................. 379/354; 379/368; 379/433; 379/355; 341/22
[58] Field of Search .................. 379/368, 396, 379/354, 355, 142, 433, 432, 88, 96; 341/21, 22

[56] References Cited

U.S. PATENT DOCUMENTS

| | | | |
|---|---|---|---|
| T966,005 | 1/1978 | Gillete | 379/354 |
| 4,709,387 | 11/1987 | Masuda | 379/354 |
| 4,868,849 | 9/1989 | Tamaoki | 379/357 |
| 4,868,862 | 9/1989 | Ryoichi et al. | 379/58 |
| 4,980,910 | 12/1990 | Oba et al. | 379/355 |
| 5,016,000 | 5/1991 | Bugg | 340/731 |
| 5,283,818 | 2/1994 | Klausner et al. | 379/67 |
| 5,386,218 | 1/1995 | Yano et al. | 345/129 |
| 5,436,954 | 7/1995 | Nishiyama et al. | 379/58 |
| 5,452,352 | 9/1995 | Talton | 379/355 |
| 5,455,857 | 10/1995 | McGuire | 379/355 |

*Primary Examiner*—Krista M. Zele
*Assistant Examiner*—Daniel S. Hunter
*Attorney, Agent, or Firm*—John C. Moran

[57] ABSTRACT

An apparatus that provides for the dialing of telephone numbers utilizing a limited number of keys such as only two keys. The apparatus provides for the creation of an internal telephone directory that includes telephone numbers and names that is also generated by only two keys. In addition, telephone numbers can be rapidly accessed from the telephone directory by the utilization of the two keys. Once these telephone numbers and names are accessed from the telephone directory, the two keys can be utilized to place a call to the accessed telephone number or to delete the entry from the telephone directory.

22 Claims, 13 Drawing Sheets

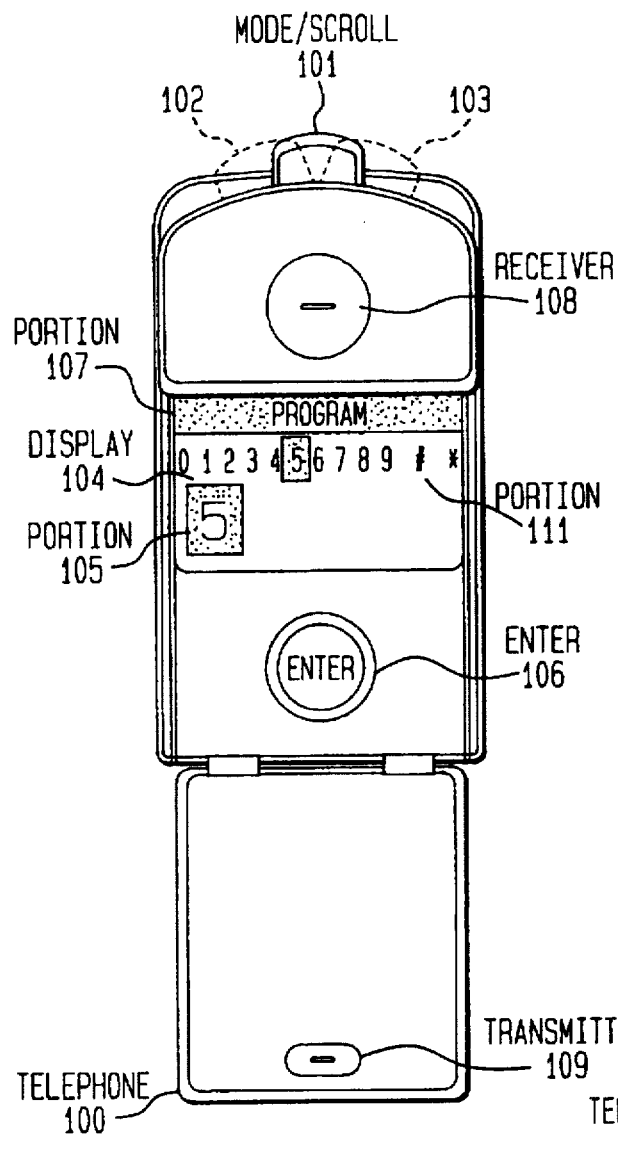
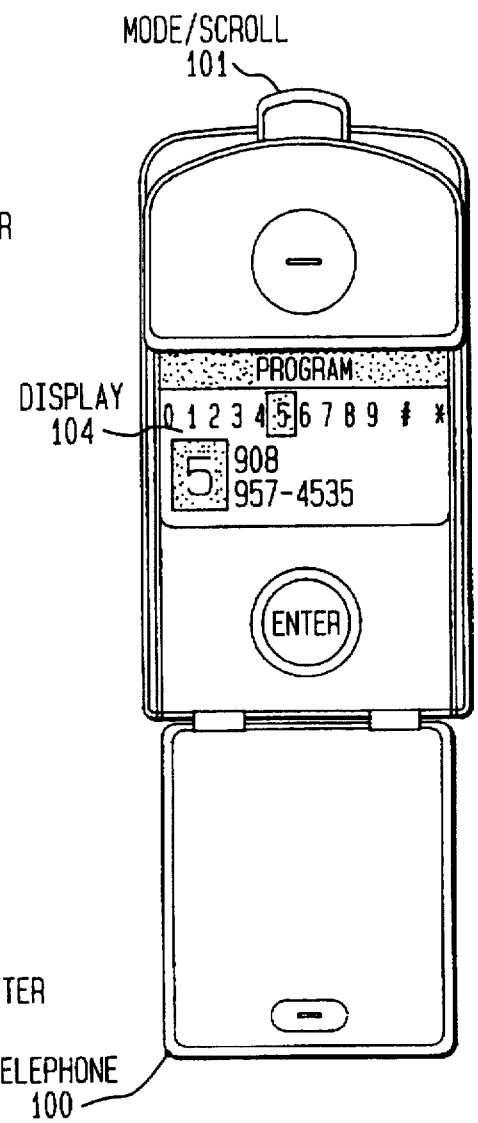

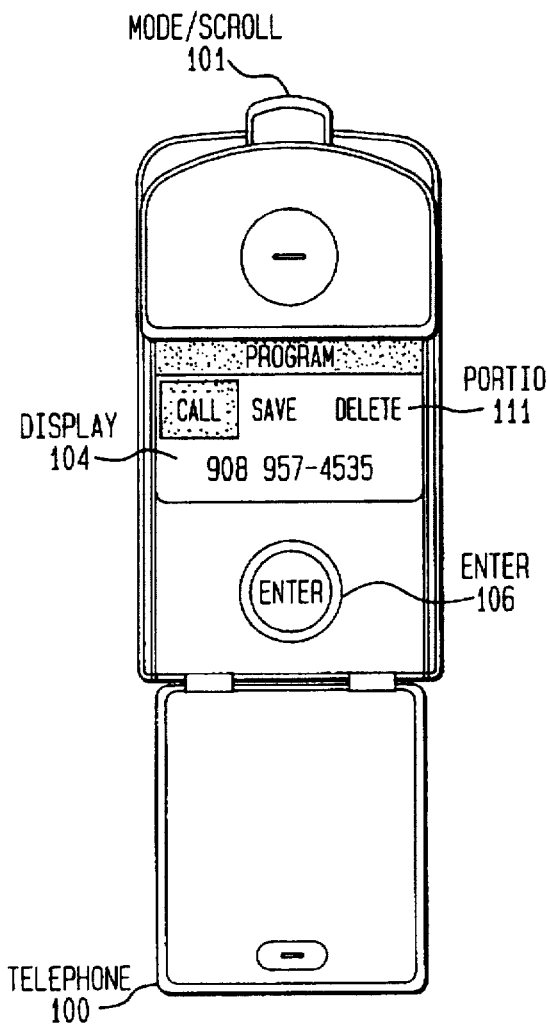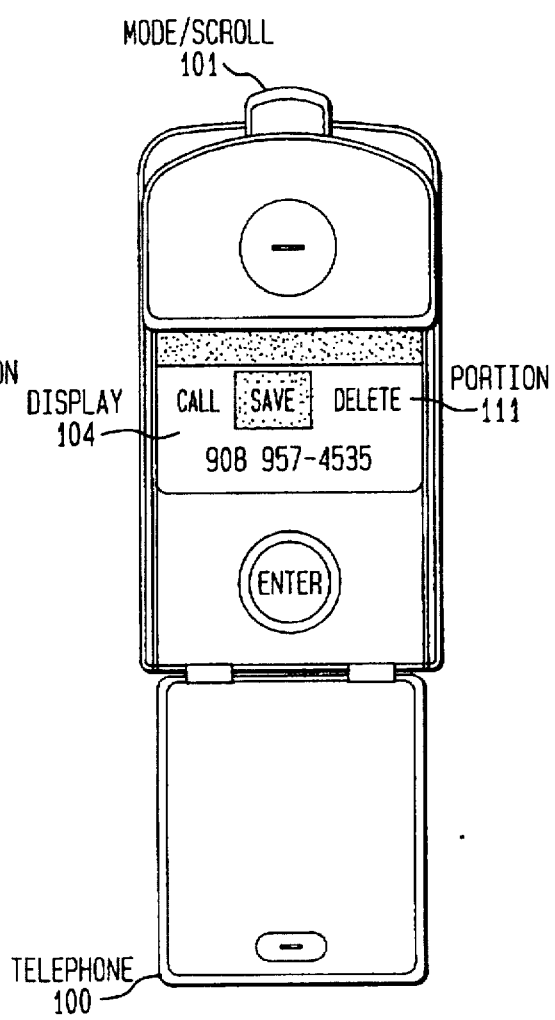

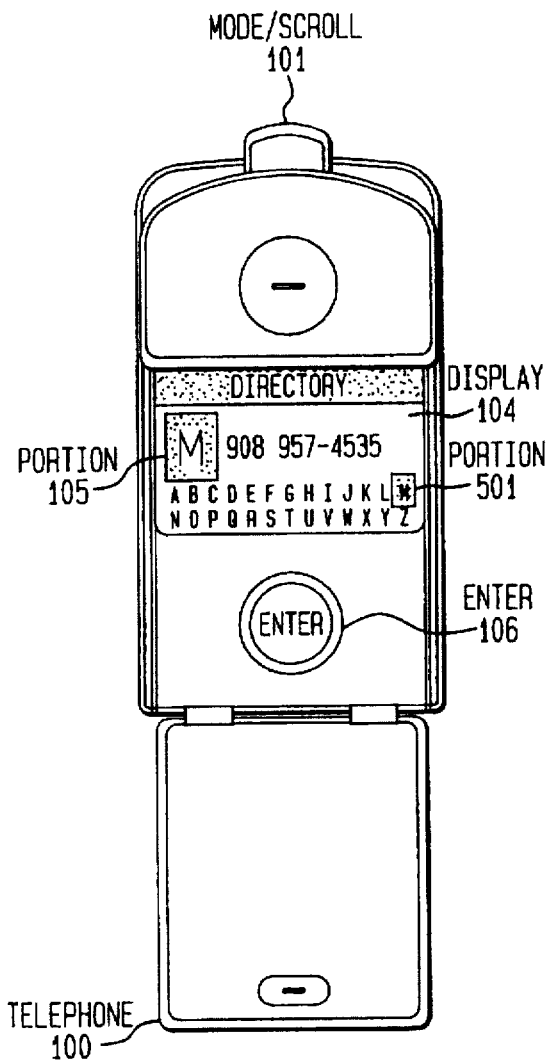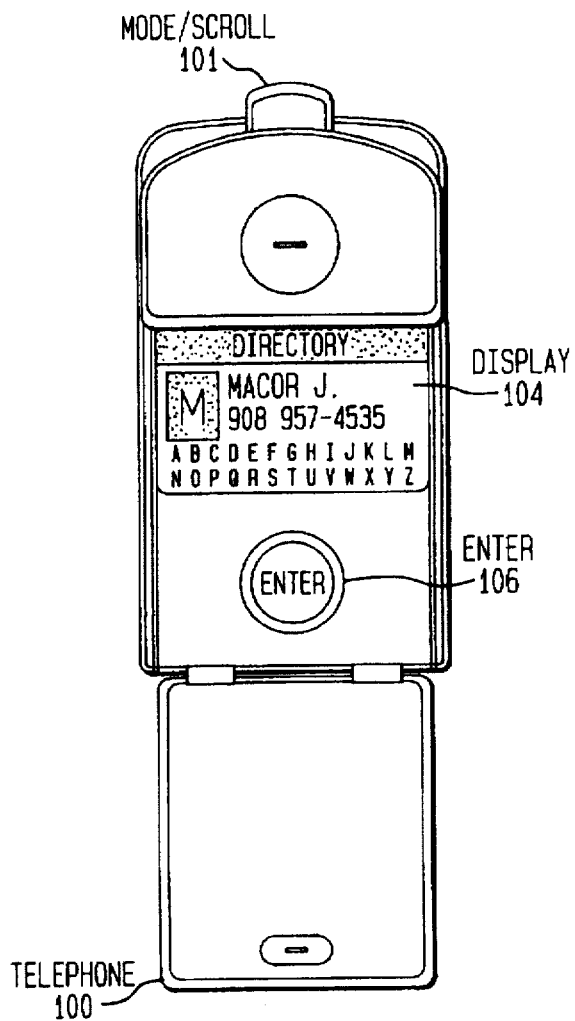

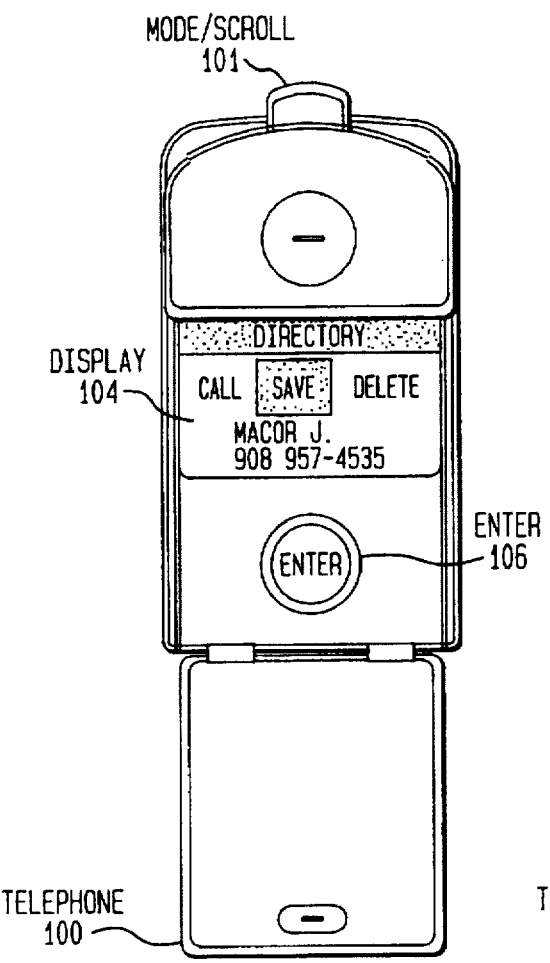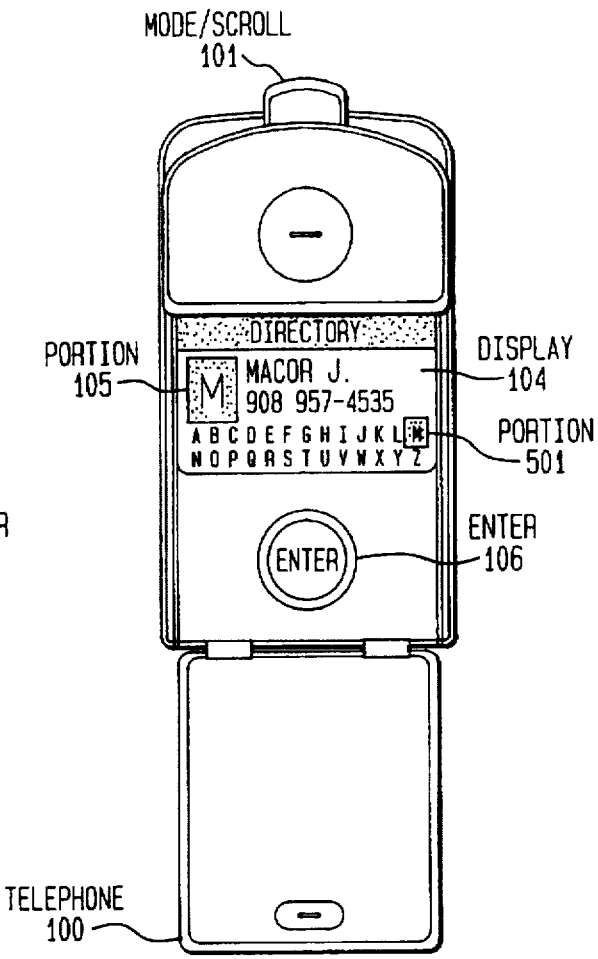

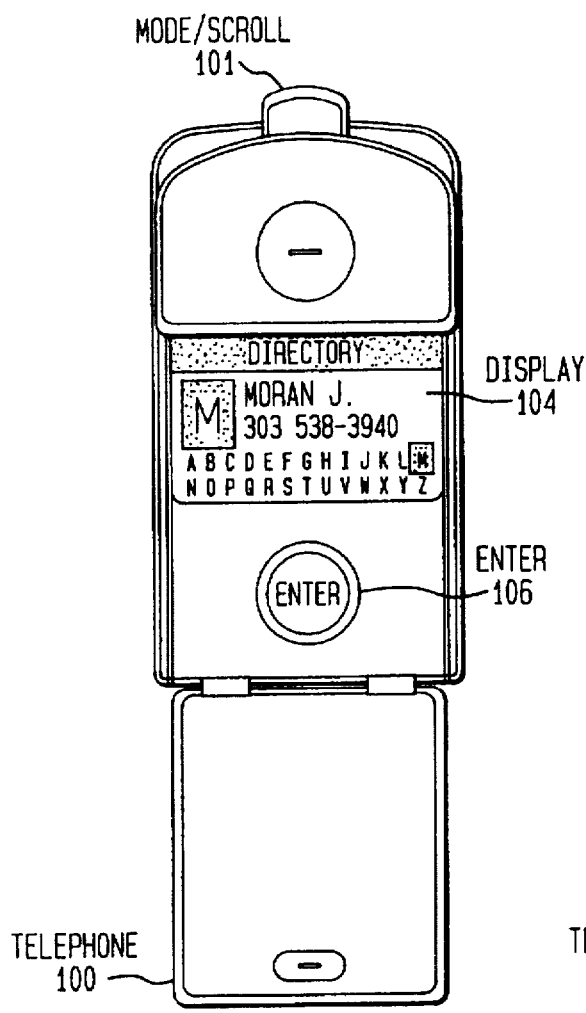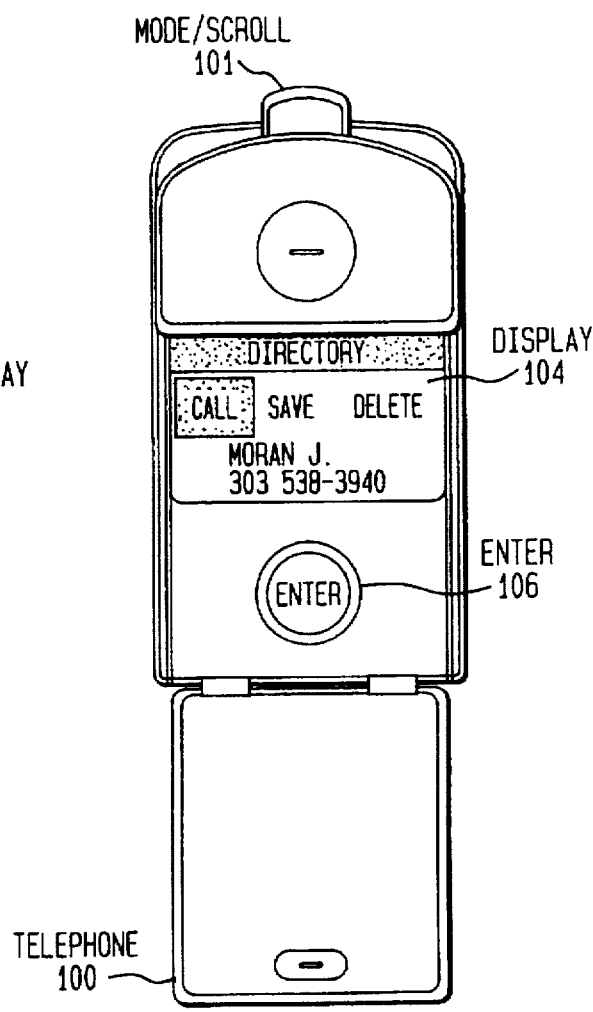

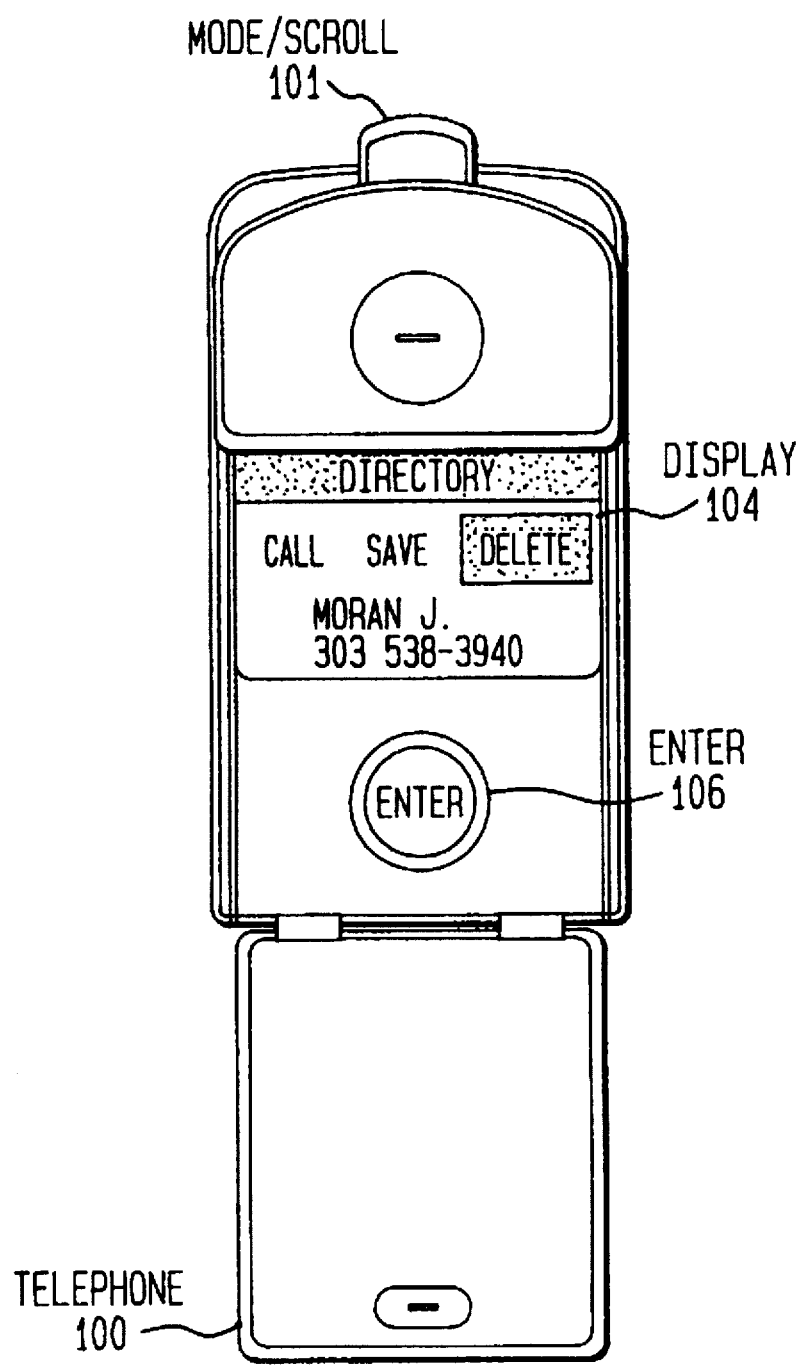

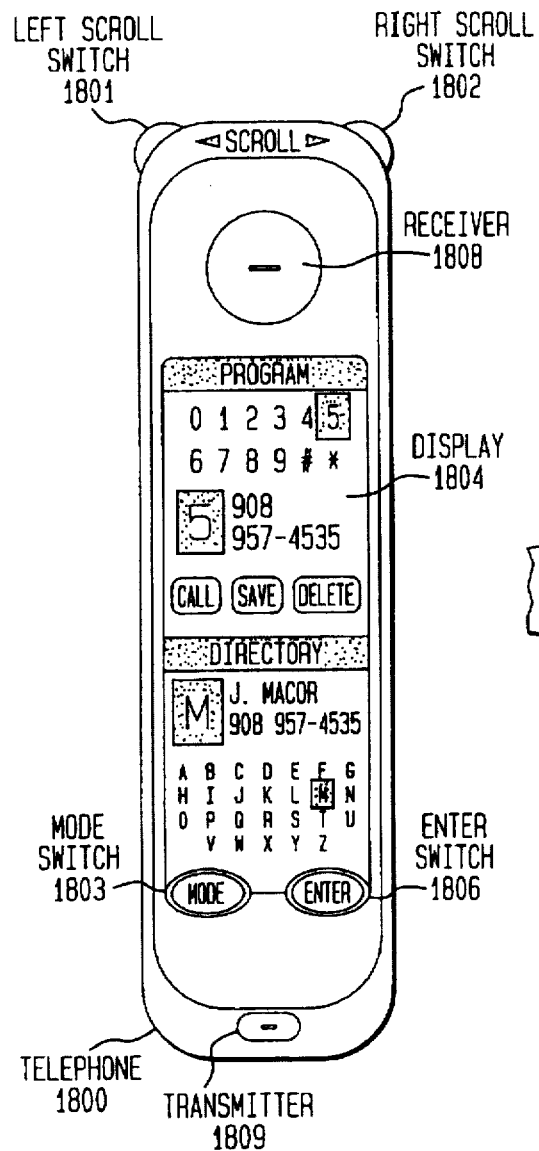
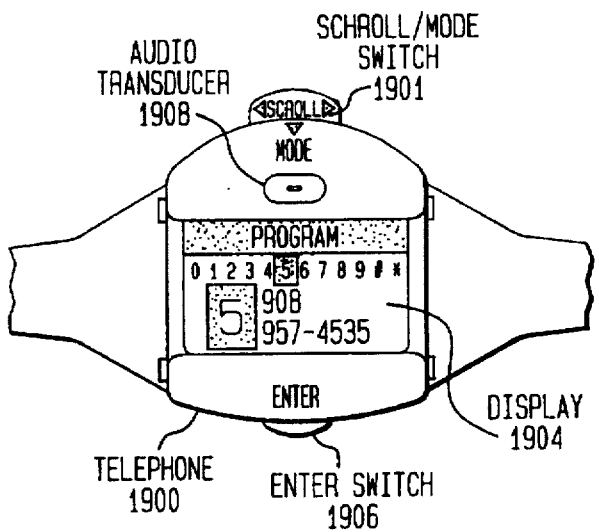

5,677,949

TELEPHONE WITH MINIMAL SWITCHES FOR DIALING

TECHNICAL FIELD

This invention relates to telephones, and, in particular, to the dialing of telephones.

BACKGROUND OF THE INVENTION

As telephones have become more portable and smaller, a problem has arisen in allowing for sufficient space on the surface of a telephone to accommodate the traditional twelve button dialing pad. As cellular and cordless have become smaller the size of the dialing pad has decreased to the point where it is difficult to dial telephone numbers with any speed or accuracy. In addition, a new generation of telephones referred to as personal communication service (PCS) telephones have become so small that it is very difficult to utilize the traditional twelve button dialing pad. In addition, the advent of telephones that are worn on the body like a wristwatch have made it impossible to effectively use the twelve button dialing pad.

One solution to this problem has been to use voice activated dialing. In voice activated dialing, the user speaks the number and the telephone or the interconnected telecommunication switching system coverts the spoken number into a digital form that can be utilized by the telecommunication switching system. Unfortunately, voice activated dialing suffers from two major problems. First, it is difficult to obtain accurate voice recognition of the spoken number in noisy audio environments. This problem restricts the use of voice activated dialing to rather quiet settings. The second problem associated with voice activated dialing, is the lack of privacy during the dialing process.

SUMMARY OF THE INVENTION

A technical advance is achieved by an apparatus that provides for the dialing of telephone numbers utilizing a limited number of keys such as only two keys. Advantageously, the apparatus provides for the creation of an internal telephone directory that includes telephone numbers and names that is also generated by only two keys. In addition, telephone numbers can be rapidly accessed from the telephone directory by the utilization of the two keys. Once these telephone numbers and names are accessed from the telephone directory, the two keys can be utilized to place a call to the accessed telephone number or to delete the entry from the telephone directory.

BRIEF DESCRIPTION OF THE DRAWING

FIGS. 1–11 illustrate a first embodiment of the invention further illustrating the different steps of telephone dialing;

FIG. 18 illustrates a second embodiment of the inventive concept; and

FIG. 19 illustrates a third embodiment of the inventive concept.

DETAILED DESCRIPTION

Figure 12:
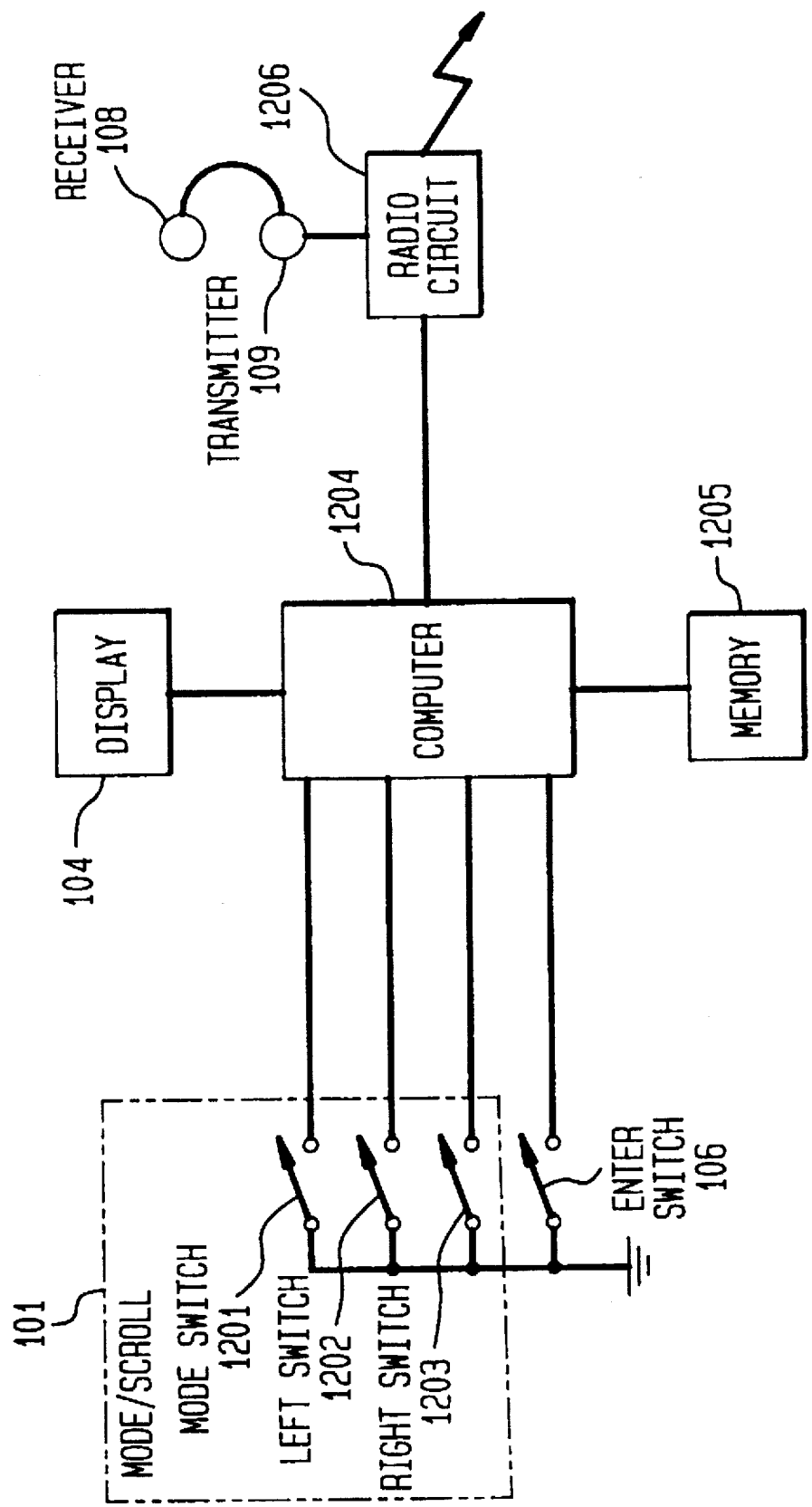
FIG. 12 illustrates, in block diagram form, the circuit elements utilized to implement the telephone illustrated in FIGS. 1–13.

FIG. 1 illustrates the first embodiment of the inventive concept. Telephone 100 is a small cellular telephone. Telephone calls are placed by dialing telephone numbers utilizing mode/scroll switch 100, enter switch 106, and display 104. Enter switch 106 is a single action switch. Mode/scroll switch 101 is a three position switch. In the normal position as illustrated in FIG. 1, if switch 101 is depressed into the body, the mode switch is actuated. If mode/scroll switch 101 is placed in the position illustrated in dash lines as 102, the left switch is activated. Finally, if switch 101 is placed in the position illustrated by dash lines as 103, the right switch is activated.

To understand the operation of telephone 100, consider the following example of dialing a telephone number and completing a telephone call. When telephone 100 is powered up or completes an operation, telephone 100 enters the state illustrated in FIG. 1. The function is the program function. To dial a number, the user utilizes switch 101 to scroll to one of the numbers illustrated in portion 111, and then actuates enter switch 106. As each character is scrolled to, it appears in enlarged form in portion 105. When enter switch 106 is actuated, the number displayed in portion 105 is concatenated into the telephone number being assembled and displayed in display 104. After the user has assembled the complete telephone number as illustrated in FIG. 2, they actuate the mode switch by actuating mode/scroll switch 101 inward towards the body of telephone 100. The actuation of the mode switch places telephone 100 in the state illustrated in FIG. 3. Note, that the "CALL" word is highlighted in portion 111. If the user wishes to place the call, the user actuates enter switch 106 and the displayed number is called. If the user wishes to abort the operation, they utilize mode/scroll switch 101 to highlight the word "DELETE". Once the word "DELETE" is highlighted, the operation is terminated by the user actuating enter switch 106.

Consider the example where the user wishes to add a telephone number and name into the internal telephone directory of telephone 100. First, the user proceeds as previously described for placing a call after dialing the telephone number. When the user reaches the state illustrated in FIG. 3, they use mode/scroll switch 101 to highlight the word "SAVE". Once this word is highlighted, the user then actuates enter switch 106. Upon actuation of enter switch 106, telephone 100 assumes the state illustrated in FIG. 4. The user then actuates the mode switch by actuating mode/scroll switch 100 downward into the body of telephone 100. In response, telephone 100 assumes the state illustrated in FIG. 5. In FIG. 5, the entered telephone number is displayed, and portion 501 displays the alphabet plus a space. The user utilizes mode/scroll switch 101 to move back and forth in the letters illustrated in portion 501. When a desired letter is encountered, the user actuates enter switch 106. In response, telephone 100 adds the letter to the name that is being formed. Once the name has been completely assembled utilizing this method, telephone 100 is in the state illustrated in FIG. 6. To save the information illustrated in FIG. 6, the user actuates the mode switch by depressing mode/scroll switch 101 in the position illustrated in FIG. 6. Telephone 100 is responsive to enter the state illustrated in FIG. 7. Note, that the word "SAVE" is highlighted. If the user wishes to save the information illustrated in display 104, the user actuates enter switch 106. If the user wants to abort the save operation, they utilize mode/scroll switch 101 to highlight the word "DELETE". Once this word is highlighted, the user can abort the SAVE operation by actuating enter switch 106.

Consider the example where the user wants to place a call to a number listed in the internal telephone directory of telephone 100. The user starts with telephone 100 in the state illustrated in FIG. 1. The user actuates the mode switch by depressing mode/scroll switch 101 until the state illustrated in FIG. 8 is achieved. Note, if the last call made utilizing the internal telephone directory had been to a person whose name started with the letter "A", the display 104 would show the first name in the "A" list. If the first name in the "A" list was displayed in FIG. 8, the user would have to utilize mode/scroll switch 101 to sequence through the letters of portion 501 until the letter "M" was highlighted in portion 105. When the letter "M" is highlighted in portion 105, the user actuates enter switch 106. The first name in the list maintained for names starting with M is displayed as illustrated in FIG. 8. Assume that the user wants to place a telephone call to the individual whose last name is "Moran". The user utilizes the mode/scroll switch 101 to display each name in the "M" list until the name "Moran" is highlighted as illustrated in FIG. 9. The user then selects the name by actuating enter switch 106. The user then actuates the mode switch by depressing the mode/scroll switch 101. Telephone 100 is responsive to enter the state illustrated in FIG. 10. If the user wishes to call the number displayed in FIG. 10, the user actuates enter switch 106. If the user wishes to delete this name and number from the internal telephone directory, the user utilizes mode/scroll switch 101 to highlight the word "DELETE". Once this word is highlighted, the user actuates enter switch 106. The highlighting of the word "DELETE" is illustrated in FIG. 11.

FIG. 12 illustrates the internal circuitry of telephone 100. Radio circuit 1206 provides cellular telephone service and such radio circuits are well known in the art. Radio circuit 1206 is responsive to telephone numbers received from computer 1204 in digital form to interact with a cellular telephone system to place telephone calls. Memory 1205 stores the program for computer 1204 and the various tables and lists utilized by computer 1204. Mode/scroll switch 101 is illustrated as mode switch 1201, left switch 1202, and right switch 1203. Elements 1201, 1202 and 1203 are also referred to as contacts 1201, contacts 1202, and contacts 1203. Mode switch 1201 is activated by placing mode/scroll switch 101 in the center position as illustrated in FIG. 1 and depressing mode/scroll switch 101 downward into telephone 100. This downward depression causes mode switch 1201 to make contact. Left switch 1202 is actuated when mode/scroll switch 101 is in position 102 of FIG. 1. Right switch 1203 is activated when mode/scroll switch 101 is in position 103 of FIG. 1. The operations performed by computer 1204 are illustrated in flow chart form in FIGS. 13–16. The program for FIGS. 13–16 is stored in memory 1505. Computer 1204 controls display 104.

Figure 13:
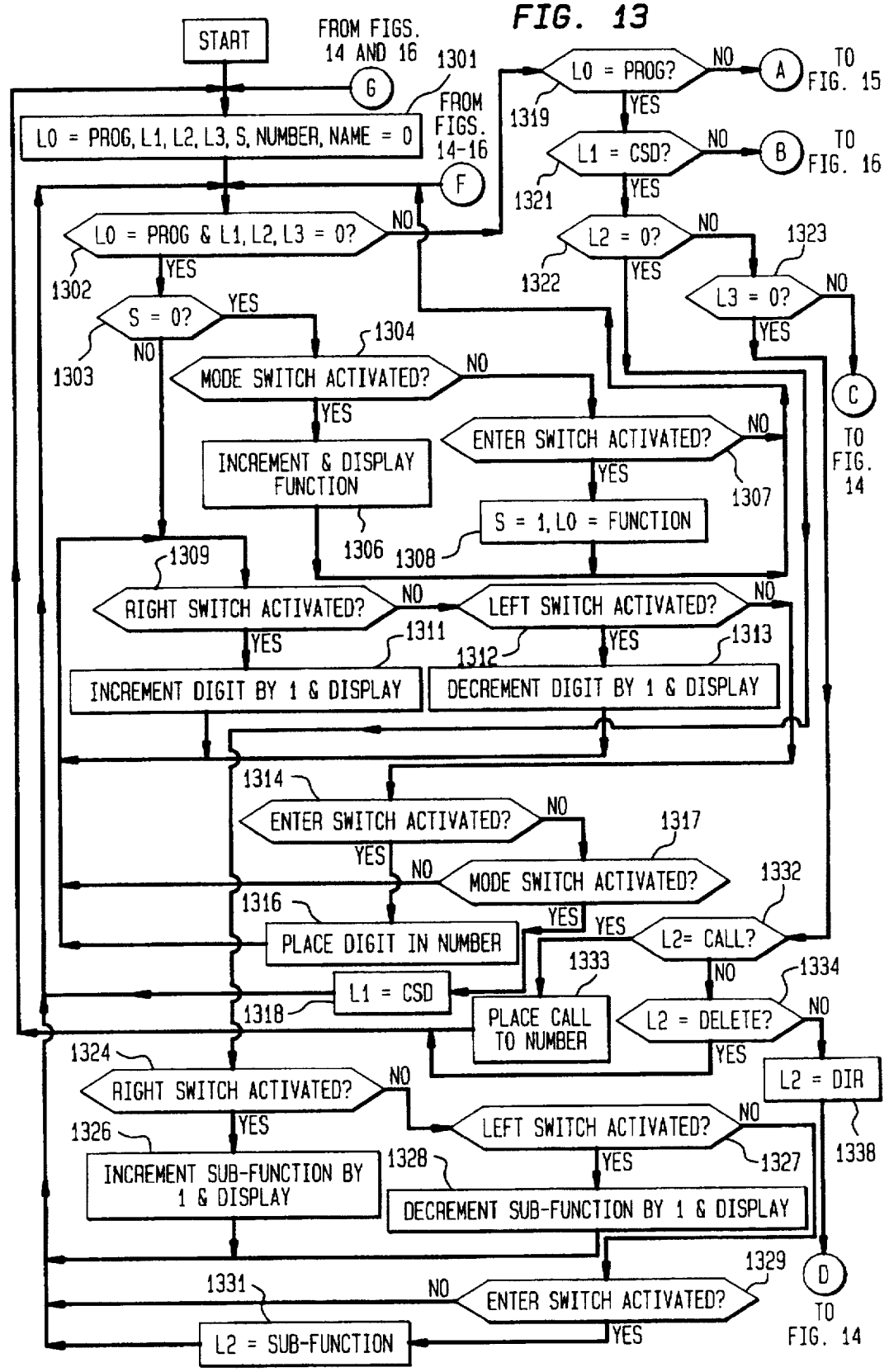
FIGS. 13–16 illustrate, in flow chart form, the operations performed by the computer illustrated in FIG. 12.
Figure 17:
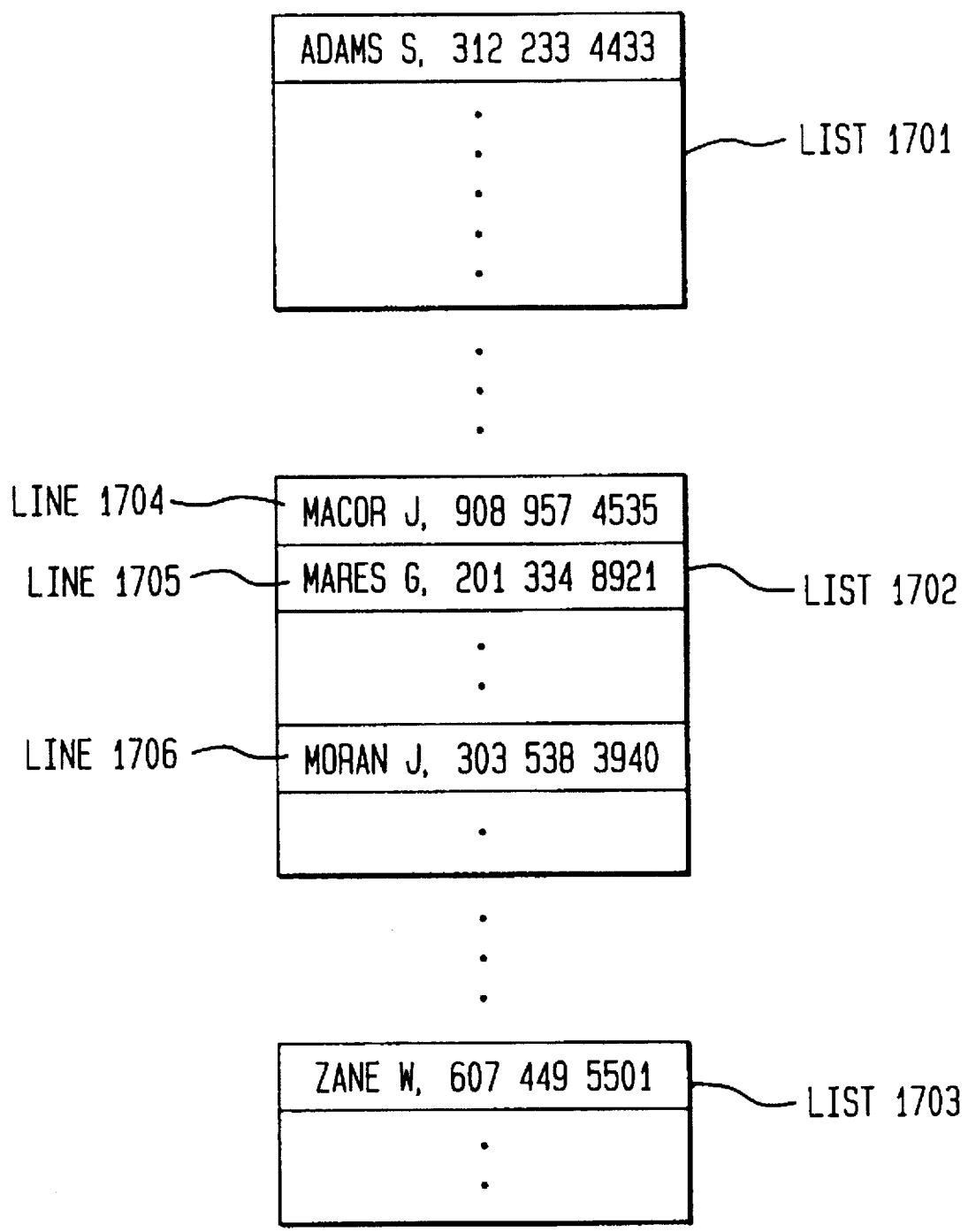
FIG. 17 illustrates telephone directory lists maintained by the computer of FIG. 12.

FIG. 13 illustrates the start of processing performed by computer 1204. When computer 1204 is powered up or completes a full operation, block 1301 is executed. Seven variables are utilized by computer 1204 during processing. L0–L3 are utilized to determine the state of a particular operation. L1, L2, and L3 are set equal to 0 by block 1301. L0 is set equal to PROG which stands for the program function. NUMBER is a variable that is used to assemble a telephone number before a call is placed or an addition is made to the internal telephone directory that is illustrated in FIG. 17. The NAME variable is utilized to collect the alphanumeric characters that form a name to be used in conjunction with the internal telephone directory. Both NUMBER and NAME are also set equal 0 by block 1301. The use of the variable "S" is described in this paragraph. Block 1301 places telephone 100 in the state illustrated in FIG. 1 although, a different number than "5" may be highlighted and placed in portion 105. After execution of block 1301, decision block 1302 is executed to check if L0 equals "PROG" and L1–L3 are still set equal to "0". If the answer is yes, this means that telephone 100 is still in the program function and control is transferred to decision block 1303 to check if variable "S" equals 0. If the decision in block 1303 is yes, this signifies that the user of telephone 100 is still in the state illustrated in FIG. 1 and has not actuated the enter switch to accept the program function. The user can step through the functions which are program, CSD (call, save, and delete) or directory. Decision block 1304 checks if the mode switch has been activated. If the answer is yes, block 1306 increments to the next function and displays that function in display 104. If the directory function is being displayed in display 104, actuation of the mode switch restarts the functions and displays the program function in display 104. After execution of block 1306, control is transferred back to decision block 1302. Returning to decision block 1304, if the answer is no, decision block 1307 checks if enter switch 106 has been actuated. If the answer is yes, L0 is set equal to the function that is currently being displayed in display 104, "S" is set equal to 1, and control is transferred back to decision block 1302. If the answer in decision block 1307 is no, control is also transferred back to decision block 1302.

Returning to decision block 1302 and assuming that the user activated entry switch 106 while the program function was being displayed in display 104. Control is then transferred from decision block 1302 to decision block 1303. Since "S" now equals 1, control is transferred from decision block 1302 to decision block 1309. Blocks 1309–1318 allow the user to enter a telephone number in the program mode utilizing left switch 1202, right switch 1203, and entry switch 106. When the user has entered the telephone number to their satisfaction as illustrated in FIG. 2, the user actuates mode switch 1201 which places telephone 100 in the CSD function as illustrated in FIG. 3.

Consider now these operations in greater detail. Decision block 1309 checks if right switch 1203 has been activated. If the answer is yes, block 1311 moves forward one digit in portion 111 and displays that digit in portion 105. If the previous digit displayed had been "*", execution of block 1311 results in a wrap around operation and the highlighting of "0". A similar operation takes place with respect to left switch 1202. Returning to decision block 1309, if the answer is no, control is transferred to decision block 1312 that checks if left switch 1202 has been actuated. If the answer is yes, block 1313 causes the highlighted number in portion 111 to be scrolled to the left (decremented by one position). The new number is also displayed in portion 105. After execution of either block 1311 or 1313, control is transferred back to decision block 1309. Returning to decision block 1312, if the answer is no, control is transferred to decision block 1314 which checks if enter switch 106 has been activated. If the answer is yes, the digit currently being displayed in portion 105 is concatenated onto the end of the NUMBER variable which is displayed in display 104. If the answer in decision block 1314 is no, decision block 1317 checks if mode switch 1201 has been activated. Activation of mode switch 1201 at this point signifies that the user has completely entered the desired telephone number as is illustrated in FIG. 2. If the answer in decision block 1317 is yes, control is transferred to block 1318 which sets L1 equal to "CSD". From blocks 1316–1318, control is transferred back to decision block 1302. Block 1318 transfers telephone 100 to the state illustrated in FIG. 3.

Returning to decision block 1302 and assuming that telephone 100 is in the state illustrated in FIG. 3 which means that L0 equals "PROG" and L1 equals "CSD". Under these conditions, decision block 1302 transfers control to decision block 1319. The answer in decision block 1319 is yes, and control is transferred to decision block 1321. The answer in decision block 1321 is yes since L1 equals "CSD". Decision block 1322 then checks if L2 equals "0". In the present example the answer is yes and control is transferred to decision block 1324.

Blocks 1324–1331 give the user the opportunity to select one of the sub-functions displayed in portion 111 of display 104 of FIG. 3. Decision block 1324 checks if right switch 1203 has been activated. If the answer is yes, block 1327 highlights the next sub-function on the right in portion 111 of FIG. 3 and returns control to decision block 1302. If the answer in decision block 1324 is no, decision block 1327 checks if left switch 1202 has been activated. If the answer is yes, block 1328 highlights the sub-function to the left of the current sub-function and returns control to decision block 1202. Note, in the present operation after control has been transferred to decision block 1302, decision blocks 1302, 1319, 1321, and 1322 will transfer control back to decision block 1324 until enter switch 106 is activated. Returning to decision block 1327. If left switch 1202 has not been activated, control is transferred to decision block 1329. If entry switch 106 has been activated, block 1331 is executed and sets L2 equal to the sub-function presently being highlighted in portion 111 of FIG. 3 and control is transferred back to decision block 1302.

Returning to decision block 1302 and assuming that L0 equals "PROG", L1 equals "CSD" and L2 equals "CALL" with L2 having been set by block 1331. Decision blocks 1302, 1319, 1321, and 1322 transfer control to decision block 1323. Decision block 1323 checks if L3 equals "0". If the answer is yes, control is transferred to decision block 1332. At this point, the contents of variable L2 are evaluated to determine whether the user chose to make a call by highlighting "CALL", abort the operation by highlighting "DELETE" or chose to enter the telephone number into the internal directory by having highlighted "SAVE" during the operations performed by blocks 1324–1331. If the user had highlighted "CALL" and actuated enter switch 106 as illustrated in FIG. 3, decision block 1332 transfers control to block 1333. In executing block 1333, computer 1204 sends the dialed number to radio circuit 1206 of FIG. 12 resulting in a telephone call being made. From block 1333, control is transferred back to block 1301. If the answer in decision block 1332 is no, control is transferred to decision block 1334. If L2 is equal to "DELETE", decision block 1334 transfers control back to block 1301 which resets the system back to the state illustrated in FIG. 1. If the answer in decision block 1334 is no, then L2 must be equal to "SAVE". Consequently, decision block 1334 transfers control to block 1338 which sets L2 equal to "DIR" and transfers control to decision block 1401 of FIG. 14.

Blocks 1401–1407 allow the user to enter the name that is to be associated with the telephone number in the internal telephone directory. Telephone 100 is presently in the state illustrated by FIG. 5. When the user has entered the full name, the user activates mode switch 1201. Consider now these operations in detail. Decision block 1401 is responsive to right switch 1203 being activated to advance the highlighted letter in portion 501 towards the letter "Z". If the letter "Z" is being highlighted and right switch 1203 is actuated, the letter "A" will be the next highlighted next. Blocks 1403 and 1404 perform a similar function but the highlighted character is moving in the direction of the letter "A". As each letter is highlighted it is also enlarged in portion 105. When the user has reached the desired letter, the user actuates entry switch 106. Decision block 1406 detects the actuation of entry switch 106 and transfers control to block 1407. The latter block then concatenates the character into the characters presently in the variable "NAME". After the user has fully assembled the desired name as illustrated in FIG. 6, the user actuates mode switch 1201. Decision block 1408 detects the activation of mode switch 1201 and transfers control to block 1409 which sets L3 equal to "CSD" and moves telephone 100 to the state illustrated in FIG. 7. Note, that the operation of blocks 1401–1409 returns control to decision block 1302. However, until mode switch 1201 is actuated and L3 set equal to "CSD", decision blocks 1302, 1313, 1321, 1322, 1323, 1332, and 1334 return control to block 1401.

Figure 14:
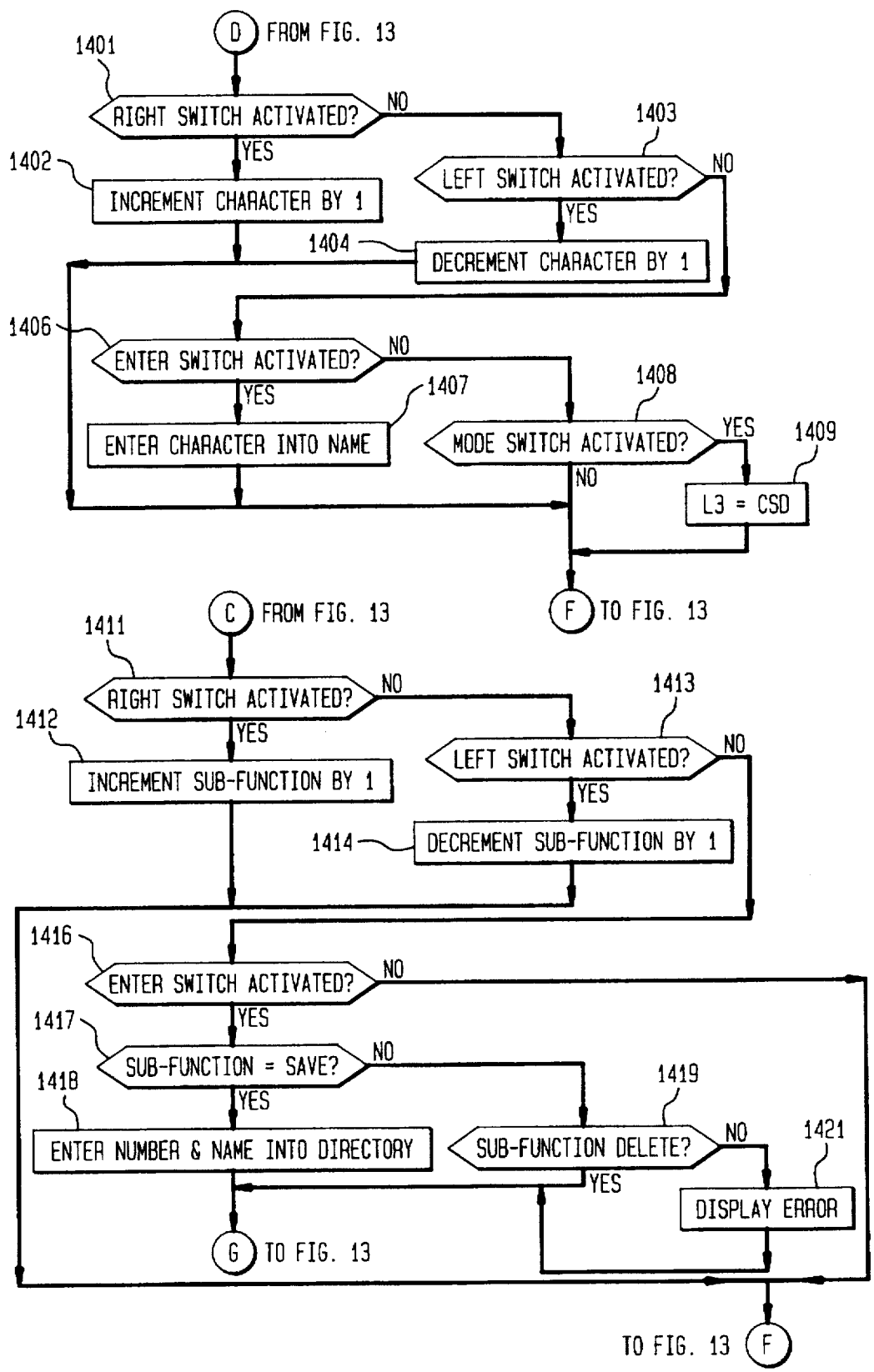
Figure 15:
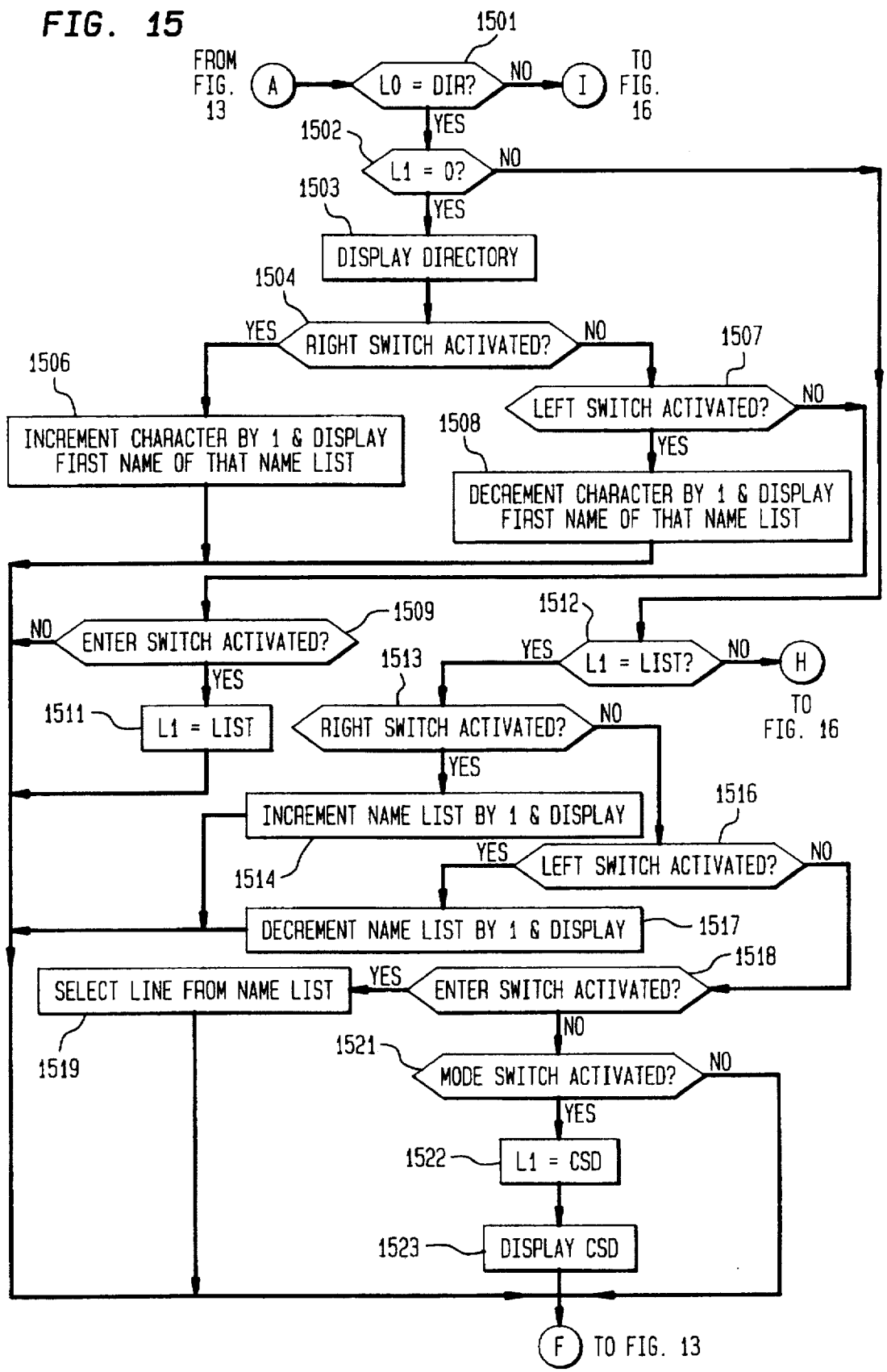
Figure 16:
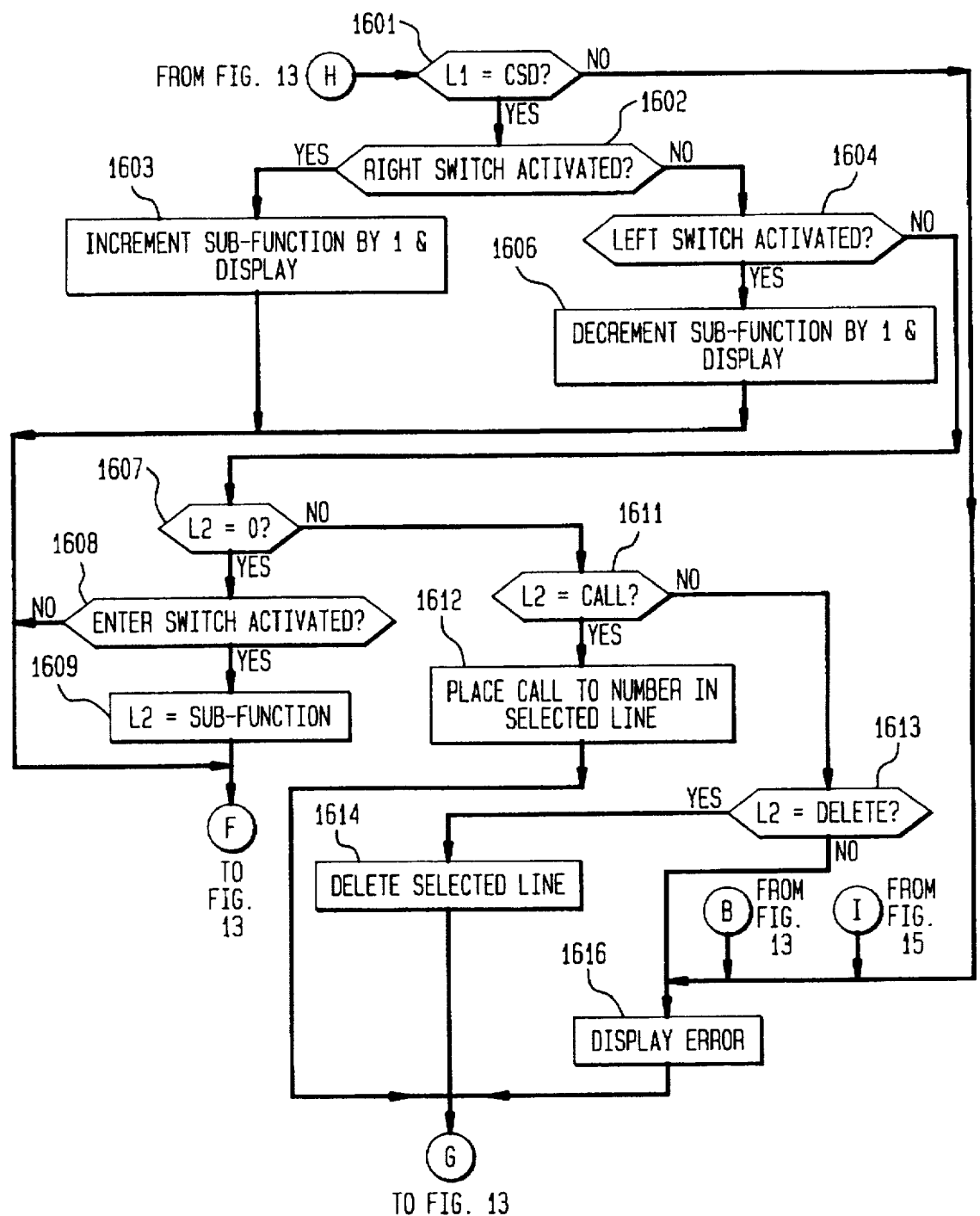

After L3 has been set equal to "CSD", decision block 1323 transfers control to decision block 1411 of FIG. 14. Blocks 1411–1413 allow the user to select the desired sub-function. In the present state of telephone 100, only the sub-functions of "SAVE" and "DELETE" are valid. Once the actuation of entry switch 106 has been detected by decision block 1416, decision block 1417 determines if the selected sub-function is SAVE. If the answer is yes, block 1418 enters the number and name into the internal telephone directory of FIG. 17. The internal telephone directory is broken up into lists 1701–1703. There is one list for each letter of the alphabet. Within a list, the names are alphabetically ordered as is illustrated by list 1702 of FIG. 7 which is for the letter "M". For the state of telephone 100 illustrated in FIG. 7, block 1418 inserts line 1704 into list 1702 of FIG. 17. Returning to decision block 1417, if the answer was no, decision block 1419 determines if the sub-function is "DELETE". If the answer is yes, this signifies that the user wants to abort the operation and control is returned to block 1301 of FIG. 13. Block 1301 resets telephone 100 to the initial state. If the answer in decision block 1419 is no, this means that the user had selected the CALL sub-function which is an error at this point. Consequently, block 1421 displays an error for a period of time and then returns control to block 1301 so that telephone 100 can be reset.

Now consider the example where the user wishes to utilize the internal telephone directory to place a call or the user wishes to delete a telephone number and name from the internal telephone directory. The operation would start with block 1301 which sets computer 1204 and consequently telephone 100 to the initial starting state. First, the user utilizes blocks 1302–1307 to select the directory function. Telephone 100 is in the state illustrated in FIG. 8. Although, the first name of the "M" list might not be displayed, and some other list would be displayed. This is determined by the last list used by the user with respect to telephone 100. After L0 has been set equal to DIR by block 1307, decision block 1302 of FIG. 13 transfers control to decision block 1319. Since L0 is equal to DIR which stands for DIRECTORY, decision block 1319 transfers control to decision block 1501 of FIG. 15. Decision block 1501 checks if L0 equals DIR for DIRECTORY. If the answer is no, this means that the user erroneously elected the "CSD" function which is an error at this point. Consequently, control is transferred to block 1616 of FIG. 16 which displays an error for a period of time before returning control to block 1301 which resets the telephone. If the answer in decision block 1501 is yes, decision block 1502 checks to see if L1 equals 0. L1 is used to determine when the user has selected the name list to be used. Initially, the answer to decision block 1502 is yes, and block 1503 displays portion 501 of FIG. 8. The user then uses the left and the right switch to determine a letter which designates which list of FIG. 17 will be utilized. Note, that there is one list in FIG. 17 for each letter of the alphabet. This operation is performed by blocks 1504–1509. When the user has highlighted the first name of the desired list, the user actuates enter switch 106. This actuation is detected by decision block 1509 which transfers control to block 1511. The latter block sets L1 equal to "LIST" and control is transferred to decision block 1302 of FIG. 13. Note, that during the operations of blocks 1504–1511 control is continuously transferred to decision block 1302 but until L1 is set equal to "LIST" control from decision block 1302 eventually comes back to decision block 1504.

Now that L1 has been set equal to "LIST", decision block 502 transfers control to decision block 512. If L1 equals "LIST", control is transferred to decision block 1513. Blocks 1513–1518 allow the user to cycle through a list names for one letter of the alphabet until the desired name is found. For example, if the user had actuated enter switch 106 while "M" was highlighted and this was detected by decision block 1509, list 1702 which is the list for the letter "M" is utilized in the operations of blocks 513–519. Using list 1702 and assuming the user wishes to dial the person named "Moran", the user utilizes right switch 103 and left switch 1202 until that name is displayed in display 104 as illustrated in FIG. 9. At this point in time, the user actuates enter switch 106 which is detected by decision block 1518. Block 1519 then selects the line presently being pointed to in the name list which in this case is list 1702.

After selecting the line of a name list, the user now can chose either to place a call to the telephone number of that line or delete the line which deletes the telephone number and the name of the person from the name list. After selection of the line of the name list, the user activates mode switch 1201. This actuation is detected by decision block 1521. Block 1522 sets L1 equal to "CSD", and block 1523 displays the CSD function along with the telephone number and the name from the selected line as illustrated in FIG. 10.

Control is transferred back to decision block 1302 of FIG. 13. Decision block 1512 receives control via decision block 1302, 1319, 1501, and 1502. Since L1 now equals CSD, decision block 1512b transfers control to decision block 1601 of FIG. 16. Block 1601–1609 give the user the opportunity to select one of the sub-functions displayed in display 104 of FIG. 10. Once the user has highlighted the desired sub-function using left switch 1202 and right switch 1203, the user actuates enter switch 106. This actuation is detected by decision block 1608 which transfers control to block 1609. The latter block sets L2 equal to the sub-function. Control is transferred back to decision block 1302; however control is received again by decision block 1601 which transfers control via decision blocks 1602 and 1604 to decision block 1607. Since L2 now has been set equal to the sub-function, decision block 1607 transfers control to decision block 1611. If L2 equals "CALL", block 1612 places a call to the number given in the selected line. In the present example that is line 1706 of FIG. 17. After placing the call, control is transferred back to block 1301 of FIG. 13. If the answer in decision block 1611 is no, control is transferred to decision block 1613. If L2 has been set equal to "DELETE", block 1614 deletes the selected line from the designated list. If L2 does not equal "DELETE", then the user has erroneously selected the sub-function "SAVE" and block 1616 displays an error for a period of time for transferring control to block 1301 of FIG. 13.

FIG. 18 illustrates a second embodiment of the inventive concept. Four switches are used: left switch 1801, right switch 1802, mode switch 1803, and enter switch 1806. Display 1804 continuously displays the three main functions. Telephone 1800 has a circuit which is identical to that of FIG. 12. The program for the computer of telephone 1800 would be similar to that illustrated in FIGS. 13–16 with changes being made to accommodate display 1804 instead of display 104.

In third embodiment of the inventive concept, FIG. 19 illustrates a telephone wristwatch that is designed to be worn on the wrist of the user. Since telephone 1900 is designed to be worn on the wrist, switches 1901 and 1906 can be operated with one hand.

It is to be understood that the above-described embodiment are merely illustrative of the principals of the invention and that other arrangements may be devised by those skilled in the art without departing from the spirit and scope of the invention. In particular, one skilled in the art could readily see that more than two switches could be utilized to perform the disclosed functions.

I claim:

1. An apparatus for providing dialing on a telephone, comprising:

memory for storing information;

means for displaying a sequence of one digit numbers;

means for highlighting individual ones of the displayed one digit numbers under control of a user of the telephone;

means for selecting individually the highlighted ones of the one digit numbers under control of the user of the telephone;

means for forming the selected highlighted ones of the one digit numbers into a telephone number in the memory where the telephone number is being stored;

the means for displaying further displays the formed telephone number;

means for placing a telephone call to the formed telephone number under control of the user of the telephone;

a first switch having three pairs of contacts and second switch having one pair of contacts and the means for highlighting comprises means for scrolling the highlighting from a higher one of the one digit numbers to a lower one or the one digit numbers in response to the user actuating a first pair of contacts of the first switch;

means for scrolling the highlighting from a lower one of the one digit numbers to a higher one of the one digit numbers in response to the user actuating a second pair of contacts of the first switch; and the means for selecting comprises means for designating the highlighted one of the one digit numbers in response to the user actuating the pair of contacts of the second switch.

2. The apparatus of claim 1 wherein the means for displaying further displaying a sequence of alphanumeric characters;

the apparatus further comprises means for highlighting individual ones of the displayed alphanumeric characters under control of the user of the telephone;

means for selecting individually the highlighted ones of the displayed alphanumeric characters under control of the user of the telephone;

means for forming the selected highlighted ones of the displayed alphanumeric characters into a name in the memory where the name is being stored; and means for inserting the formed telephone number and the formed name into a telephone directory stored in the memory under control of the user.

3. The apparatus of claim 2 wherein the means for placing comprises means for displaying sub-functions in response to the user actuating a third pair of contacts of the first switch;

means for detecting a selection of a sub-function by the user actuating the pair contacts of the second switch; and means for originating the call upon the selected sub-function being to place a call.

4. An apparatus for providing dialing on a telephone, comprising:

memory for storing information;

means for displaying a sequence of one digit numbers;

means for highlighting individual ones of the displayed one digit numbers under control of a user of the telephone;

means for selecting individually the highlighted ones of the one digit numbers under control of the user of the telephone;

means for forming the selected highlighted ones of the one digit numbers into a telephone number in the memory where the telephone number is being stored;

the means for displaying further displays the formed telephone number;

means for placing a telephone call to the formed telephone number under control of the user of the telephone;

a first switch, second switch, third switch, and fourth switch;

the means for highlighting comprises means for scrolling the highlighting from a higher one of the one digit numbers to a lower one of the one digit numbers in response to the user actuating the first switch;

means for scrolling the highlighting from a lower one of the one digit numbers to a higher one of the one digit numbers in response to the user actuating the second switch;

the means for selecting comprises means for designating the highlighted one of the one digit numbers in response to the user actuating the third switch;

the means for displaying further displaying a sequence of alphanumeric characters;

the apparatus further comprises means for highlighting individual ones of the displayed alphanumeric characters under control of the user of the telephone;

means for selecting individually the highlighted ones of the displayed alphanumeric characters under control of the user of the telephone;

means for forming the selected highlighted ones of the displayed alphanumeric characters into a name in the memory where the name is being stored; and means for inserting the formed telephone number and the formed name into a telephone directory stored in the memory under control of the user.

5. The apparatus of claim 4 wherein the means for placing comprises means for displaying sub-functions in response to the user actuating the fourth switch;

means for detecting a selection of a sub-function by the user actuating the third switch; and means for originating the call upon the selected sub-function being to place a call.

6. The apparatus of claim 5 wherein the means for highlighting comprises means for directing the means for displaying to display the highlighted one of the one digit numbers in enlarged form.

7. An apparatus for providing dialing on a telephone, comprising:

a memory;

means for displaying a sequence of alphanumeric characters;

means for highlighting one of the displayed alphanumeric characters under control of the user of the telephone;

means for selecting the highlighted one of the displayed alphanumeric characters under control of the user of the telephone;

means for accessing a telephone directory stored in the memory to designate a list consisting of names starting with the selected one of the displayed alphanumeric characters;

means for selecting one of the names from the designated list under control of the user of the telephone;

means for placing telephone call to a telephone number corresponding to the selected one of the names;

a first switch having three pairs of contacts and second switch having one pair of contacts and the means for highlighting comprises means for scrolling the highlighting from a higher one of the alphanumeric characters to a lower one of the alphanumeric characters in response to the user actuating a first pair of contacts of the first switch;

means for scrolling the highlighting from a lower one of the alphanumeric characters to a higher one of the alphanumeric characters in response to the user actuating a second pair of contacts of the first switch;

the means for selecting the highlighted one of the displayed alphanumeric characters comprises means for designating the highlighted one of the alphanumeric characters in response to the user actuating the pair of contacts of the second switch;

the means for accessing comprises means for scrolling through the names that are displayed one at a time from a higher one of the names in the designated list to a lower one of the names in the designated list in response to the user actuating the first pair of contacts of the first switch;

means for scrolling through the names that are displayed one at a time from a lower one of the names in the designated list to a higher one of the names in the designated list in response to the user actuating the second pair of contacts of the first switch; and the means for selecting one of the names comprises means for designating a displayed one of the names in response to the user actuating the pair of contacts of the second switch.

8. The apparatus of claim 7 wherein the means for placing comprises means for displaying sub-functions in response to the user actuating a third pair of contacts of the first switch;

means for detecting a selection of a sub-function by the user actuating the pair contacts of the second switch; and means for originating the call upon the selected sub-function being to call.

9. The apparatus of claim 8 wherein the means for highlighting comprises means for directing the means for displaying to display the highlighted one of the alphanumeric characters in enlarged form.

10. An apparatus for providing dialing on a telephone, comprising:

a memory;

means for displaying a sequence of alphanumeric characters;

means for highlighting one of the displayed alphanumeric characters under control of the user of the telephone;

means for selecting the highlighted one of the displayed alphanumeric characters under control of the user of the telephone;

means for accessing a telephone directory stored in the memory to designate a list consisting of names starting with the selected one of the displayed alphanumeric characters;

means for selecting one of the names from the designated list under control of the user of the telephone;

means for placing telephone call to a telephone number corresponding to the selected one of the names;

a first switch, second switch, third switch, and fourth switch and the means for highlighting comprises means for scrolling the highlighting from a higher one of the alphanumeric characters to a lower one of the alphanumeric characters in response to the user actuating the first switch;

means for scrolling the highlighting from a lower one of the alphanumeric characters to a higher one of the alphanumeric characters in response to the user actuating the second switch;

the means for selecting the highlighted one of the displayed alphanumeric characters comprises means for designating the highlighted one of the alphanumeric characters in response to the user actuating the third switch;

the means for accessing comprises means for scrolling through the names that are displayed one at a time from a higher one of the names in the designated list to a lower one of the names in the designated list in response to the user actuating the first switch;

means for scrolling through the names that are displayed one at a time from a lower one of the names in the designated list to a higher one of the names in the designated list in response to the user actuating the second switch; and the means for selecting one of the names comprises means for designating a displayed one of the names in response to the user actuating the third switch.

11. The apparatus of claim 10 wherein the means for placing comprises means for displaying sub-functions in response to the user actuating the first switch;

means for detecting a selection of a sub-function by the user actuating the third switch; and means for originating the call upon the selected sub-function being to call.

12. A method for providing dialing on a telephone having a memory for storing information, comprising:

displaying a sequence of one digit numbers;

highlighting individual ones of the displayed one digit numbers under control of a user of the telephone;

selecting individually the highlighted ones of the one digit numbers under control of the user of the telephone;

forming the selected highlighted ones of the one digit numbers into a telephone number in the memory where the telephone number is being stored;

the step of displaying further displays the formed telephone number;

placing a telephone call to the formed telephone number under control of the user of the telephone;

a first switch having three pairs of contacts and second switch having one pair of contacts and the step of highlighting comprises the steps of scrolling the highlighting from a higher one of the one digit numbers to a lower one of the one digit numbers in response to the user actuating a first pair of contacts of the first switch;

scrolling the highlighting from a lower one of the one digit numbers to a higher one of the one digit numbers in response to the user actuating a second pair of contacts of the first switch; and the step of selecting comprises the step of designating the highlighted one of the one digit numbers in response to the user actuating the pair of contacts of the second switch.

13. The method of claim 12 wherein the step of displaying further displaying a sequence of alphanumeric characters;

the method further comprises the steps of highlighting individual ones of the displayed alphanumeric characters under control of the user of the telephone;

selecting individually the highlighted ones of the displayed alphanumeric characters under control of the user of the telephone;

forming the selected highlighted ones of the displayed alphanumeric characters into a name in the memory where the name is being stored; and inserting the formed telephone number and the formed name into a telephone directory stored in the memory under control of the user.

14. The method of claim 13 wherein the step of placing comprises the steps of displaying sub-functions in response to the user actuating a third pair of contacts of the first switch;

detecting a selection of a sub-function by the user actuating the pair contacts of the second switch; and originating the call upon the selected sub-function being to place a call.

15. A method for providing dialing on a telephone having a memory for storing information, comprising:

displaying a sequence of one digit numbers;

highlighting individual ones of the displayed one digit numbers under control of a user of the telephone;

selecting individually the highlighted ones of the one digit numbers under control of the user of the telephone;

forming the selected highlighted ones of the one digit numbers into a telephone number in the memory where the telephone number is being stored;

the step of displaying further displays the formed telephone number; and placing a telephone call to the formed telephone number under control of the user of the telephone;

a first switch, second switch, third switch, and fourth switch;

the step of highlighting comprises the steps of scrolling the highlighting from a higher one of the one digit numbers to a lower one of the one digit numbers in response to the user actuating the first switch;

scrolling the highlighting from a lower one of the one digit numbers to a higher one of the one digit numbers in response to the user actuating the second switch; and the step of selecting comprises the step of designating the highlighted one of the one digit numbers in response to the user actuating the third switch.

16. The method of claim 15 wherein the step of placing comprises the steps of displaying sub-functions in response to the user actuating the fourth switch;

detecting a selection of a sub-function by the user actuating the third switch; and originating the call upon the selected sub-function being to place a call.

17. The method of claim 16 wherein the step of highlighting comprises the step of directing the step of displaying to display the highlighted one of the one digit numbers in enlarged form.

18. A method for providing dialing on a telephone having a memory, comprising the steps of:

displaying a sequence of alphanumeric characters;

highlighting one of the displayed alphanumeric characters under control of the user of the telephone;

selecting the highlighted one of the displayed alphanumeric characters under control of the user of the telephone;

accessing a telephone directory stored in the memory to designate a list consisting of names starting with the selected one of the displayed alphanumeric characters;

selecting one of the names from the designated list under control of the user of the telephone;

placing telephone call to a telephone number corresponding to the selected one of the names;

a first switch having three pairs of contacts and second switch having one pair of contacts and the step of highlighting comprises the steps of scrolling the highlighting from a higher one of the alphanumeric characters to a lower one of the alphanumeric characters in response to the user actuating a first pair of contacts of the first switch;

scrolling the highlighting from a lower one of the alphanumeric characters to a higher one of the alphanumeric characters in response to the user actuating a second pair of contacts of the first switch;

the step of selecting the highlighted one of the displayed alphanumeric characters comprises the step of designating the highlighted one of the alphanumeric characters in response to the user actuating the pair of contacts of the second switch;

the step of accessing comprises the steps of scrolling through the names that are displayed one at a time from a higher one of the names in the designated list to a lower one of the names in the designated list in response to the user actuating the first pair of contacts of the first switch;

scrolling through the names that are displayed one at a time from a lower one of the names in the designated list to a higher one of the names in the designated list in response to the user actuating the second pair of contacts of the first switch; and the step of selecting one of the names comprises the step of designating a displayed one of the names in response to the user actuating the pair of contacts of the second switch.

19. The method of claim 18 wherein the step of placing comprises the steps of displaying sub-functions in response to the user actuating a third pair of contacts of the first switch;

detecting a selection of a sub-function by the user actuating the pair contacts of the second switch; and originating the call upon the selected sub-function being to call.

20. The method of claim 19 wherein the step of highlighting comprises the step of directing the step of displaying to display the highlighted one of the alphanumeric characters in enlarged form.

21. A method for providing dialing on a telephone having a memory, comprising the steps of:

displaying a sequence of alphanumeric characters;

highlighting one of the displayed alphanumeric characters under control of the user of the telephone;

selecting the highlighted one of the displayed alphanumeric characters under control of the user of the telephone;

accessing a telephone directory stored in the memory to designate a list consisting of names starting with the selected one of the displayed alphanumeric characters;

selecting one of the names from the designated list under control of the user of the telephone; and placing telephone call to a telephone number corresponding to the selected one of the names;

a first switch, second switch, third switch, and fourth switch and the step of highlighting comprises the steps of scrolling the highlighting from a higher one of the alphanumeric characters to a lower one of the alphanumeric characters in response to the user actuating the first switch;

scrolling the highlighting from a lower one of the alphanumeric characters to a higher one of the alphanumeric characters in response to the user actuating the second switch;

the step of selecting the highlighted one of the displayed alphanumeric characters comprises the step of designating the highlighted one of the alphanumeric characters in response to the user actuating the third switch;

the step of accessing comprises the steps of scrolling through the names that are displayed one at a time from a higher one of the names in the designated list to a lower one of the names in the designated list in response to the user actuating the first switch;

scrolling through the names that are displayed one at a time from a lower one of the names in the designated list to a higher one of the names in the designated list in response to the user actuating the second switch; and the step of selecting one of the names comprises the step of designating the a displayed one of the names in response to the user actuating the third switch.

22. The method of claim 21 wherein the step of placing comprises the steps of displaying sub-functions in response to the user actuating the first switch;

detecting a selection of a sub-function by the user actuating the third switch; and originating the call upon the selected sub-function being to call.

* * * * *